UNITED STATES PATENT OFFICE.

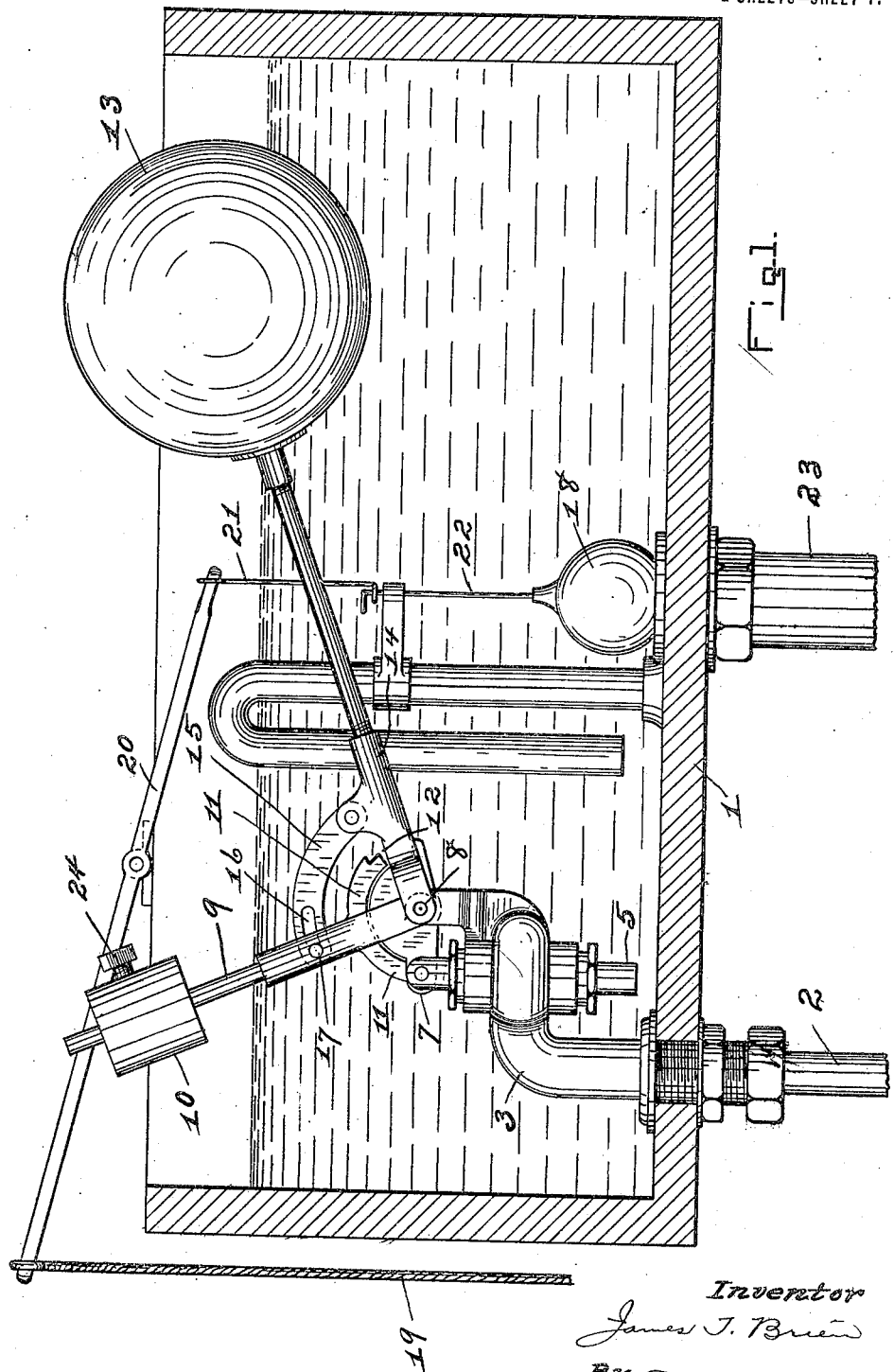

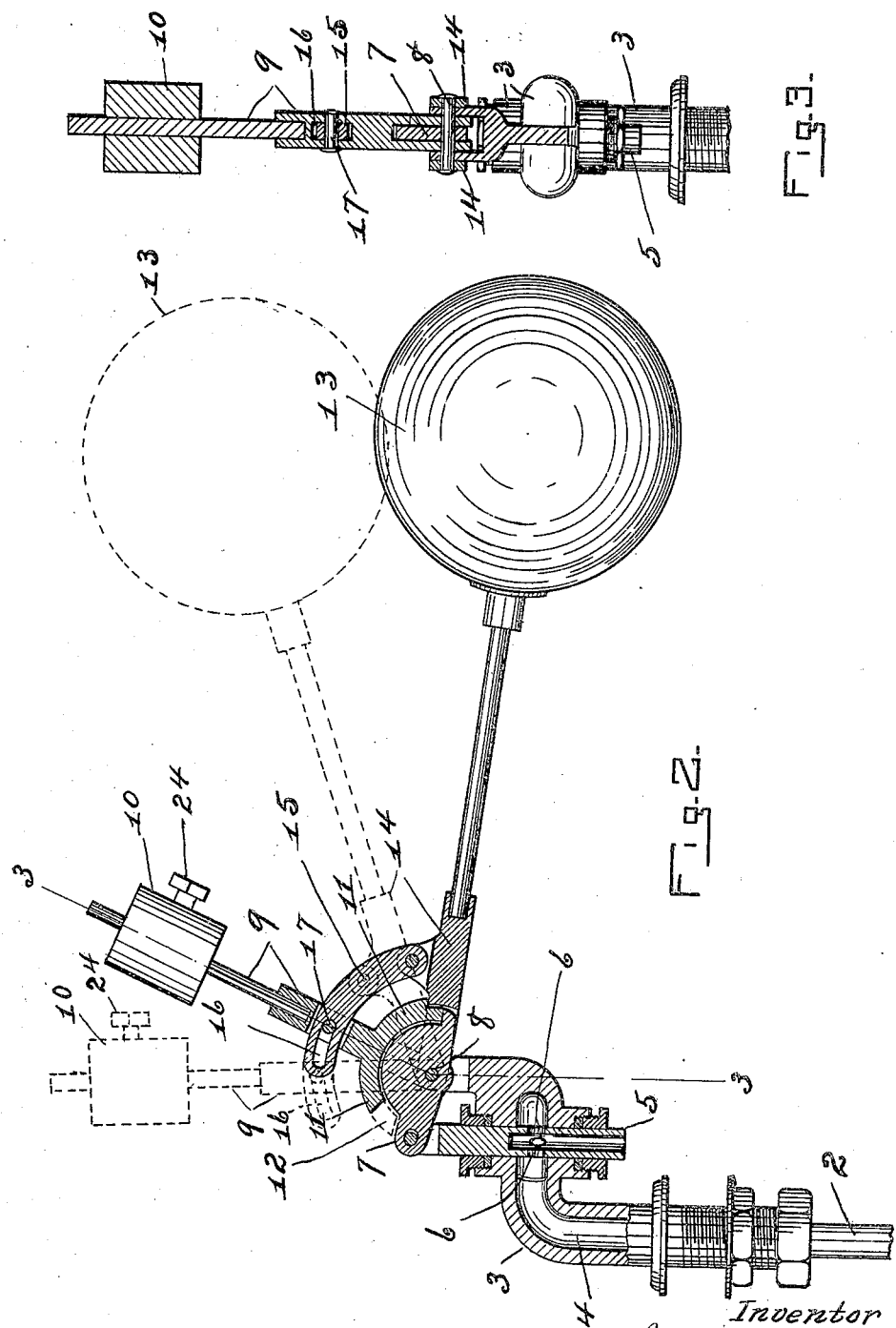

JAMES T. BRIEN, OF HOOSICK FALLS, NEW YORK, ASSIGNOR OF ONE-HALF TO JOHN C. HASWELL, OF DAYTON, OHIO; JENNIE R. BRIEN EXECUTRIX OF SAID JAMES T. BRIEN, DECEASED.

FLOAT-VALVE.

1,312,678.  Specification of Letters Patent.  Patented Aug. 12, 1919.

Application filed February 2, 1917. Serial No. 146,246.

*To all whom it may concern:*

Be it known that I, JAMES T. BRIEN, a citizen of the United States, residing at Hoosick Falls, county of Rensselaer, and State of New York, have invented certain new and useful Improvements in Float-Valves, of which the following is a specification.

Reference may be had to the accompanying drawings, and the reference characters marked thereon, which form a part of this specification. Similar characters refer to similar parts in the several figures therein.

The invention relates to float-valves for various purposes, and is particularly adapted for use as a float-valve for a flushing-tank.

The principal objects of the invention are to maintain the valve fully closed until the float reaches substantially the limit of its downward movement; then to automatically and quickly fully open the valve; to maintain the valve fully opened until the float reaches substantially the limit of its upward movement; and then to automatically and quickly fully close the valve.

Other objects will appear in connection with the following description.

Figure 1 of the drawings is a view in cross-section of a flushing-tank showing in side elevation my improved float-valve mounted therewithin.

Fig. 2 is a vertical section taken through the float-valve centrally of the valve and at right angles to the axis of the valve-operating lever.

Fig. 3 is a cross-section of the same taken on the broken line 3—3 in Fig. 2.

Referring to the drawings wherein the invention is shown in preferred form, 1 is a flushing-tank supplied by a water-pipe, 2, which communicates with a valve-case, 3, mounted within the tank, said valve-case being provided with a passageway, 4.

A tubular valve, 5, is mounted to reciprocate longitudinally within the valve-case, and is provided with one or more openings, 6, adapted to communicate with the passageway, 4, when the valve is in raised position. When the valve is in lowered position its openings, 6, are located opposite closed portions of the valve-case, which serve to close the valve.

When the valve is open, the water from the supply-pipe, 2, passes from the passageway, 4, through the openings, 6, into the tubular valve escaping from its lower open end into the flushing-tank.

A valve-operating lever, 7, is rockably mounted upon a horizontal axis, 8, with one of its ends loosely pivoted to the upper end of the valve, 5.

A weight-carrying member, 9, is rockably mounted coaxially with the valve-operating lever, 7, and carries a weight, 10, which automatically moves said member, 9, in either direction upon passing a dead-center.

Wings, 11, on the weight-carrying member, 9, are adapted to engage and actuate the valve-operating lever, 7, alternately in opposite directions.

Provision is made for lost-motion between the respective wings, 11, and the valve-operating lever, 7, as at 12, by so limiting the length of said wings that from either extreme position of the weight-carrying member, 9, in which one of its wings, 11, is in engagement with the valve-operating lever, 7, said weight-carrying member can be moved to a point substantially at or just beyond a dead-center before the other of said wings, 11, will engage the valve-operating lever, 7.

A float, 13, is fixed upon a lever, 14, pivotally mounted coaxially with the valve-operating lever, 7, and weight-carrying member, 9, and this float-lever, 14, is connected by means of a link, 15, with the weight-carrying member, 9, said link being provided with a slot, 16, engaging a pin, 17, on the weight-carrying member with provision for lost-motion substantially as great as the movement of the weight-carrying member in either closing or opening the valve, 5.

The weight of the float, 13, is such that it slightly overbalances the weight-carrying member, 9, and its weight, 10, so that when the flushing-tank is filled to the desired level, as shown in Fig. 1, part of the weight of the float is supported by the water in the tank.

The operation of the device is a follows:

The tank being filled to the desired level, as shown in Fig. 1, the weighted member, 9, it at the limit of its movement to close the valve, 5, with its valve-closing wing, 11, in engagement with the valve-operating lever, 7.

It will be understood that the valve, 5, will remain closed until forcibly opened by the engagement of the other of said wings, 11, with the valve-operating lever, 7, due to a movement of the weight-carrying member, 9, past a dead-center.

The outlet-valve, 18, having been opened by a pull of the cord or chain, 19, upon the lever, 20, connected by a link, 21, with the stem, 22, of said outlet valve, 18, the water flows out from the flushing-tank through the pipe, 23.

As the level of the water descends within the tank the float, 13, also descends, gradually moving the weight-carrying member, 9, toward its dead-center but without operating the valve, 5; and the parts are so proportioned and arranged that said weight-carrying member passes its dead-center just as the float reaches substantially the limit of its downward movement, which position it reaches only as the flushing-tank becomes substantially empty.

As the weight-carrying member, 9, is thus carried past its dead-center by the descending movement of the float, said weight-carrying member automatically completes its movement which is permitted by the lost-motion afforded by the slot, 16.

This automatic movement of the weighted member, 9, causes its valve-opening wing, 11, to engage the valve-operating lever, 7, and practically instantaneously opens the valve, 5, which had remained fully closed up to this time.

By the time the valve, 5, has been thus opened the outlet-valve, 18, of the flushing-tank will have automatically closed, so that the water entering the tank through the valve, 5, gradually rises within the tank carrying the float, 13, upward.

This upward movement of the float gradually moves the weight-carrying member, 9, in the reverse direction toward its dead-center, without operating the valve, 5, until the weight-carrying member passes its dead-center which it does at substantially the time the float reaches the limit of its upward movement.

As soon as the weight-carrying member, 9, has been moved past its dead-center by the upward movement of the float it automatically completes its movement, which is permitted by the slot, 16, causing its valve-closing wing, 11, to engage the valve operating lever, 7, to close the valve.

It will thus be seen that the valve, 5, remains fully closed until the flushing-tank is substantially empty, and that it is then automatically and quickly fully opened; and that it remains thus fully opened until the flushing-tank is substantially filled to the desired level; and it is then automatically and quickly fully closed.

By the use of a float-valve made in accordance with my invention, the tank can be much more quickly filled, and the amount of water used can be much more accurately regulated, the latter result being of importance where the water is metered and payment exacted for the amount used.

The invention also dispenses with much of the noise in the operation of the flushing-tank, because there is no inflow from the valve, 5, while the water is escaping from the tank through the pipe, 23.

While I have employed a valve-operating lever, 7, as a means for causing the weighted member, 9, to open and close the valve with provision for lost-motion, I do not wish to be limited to this feature, as for certain purposes of the invention various devices might be employed for causing the weighted member to thus act upon the valve.

The weight-carrying member, 9, is primarily the valve-operating member and the valve-operating lever, 7, is an illustration of one of various means which may be employed for causing the weight-carrying member, 9, to act upon the valve with provision for lost-motion.

The weight, 10, is adjustable upon the weight-carrying member, 9, and is secured in adjusted position by means of a set-screw, 24.

What I claim as new and desire to secure by Letters Patent is—

In a float-valve and in combination, a valve-case provided with a passageway; a tubular valve mounted to slide longitudinally within the valve-case and provided with an opening adapted in certain positions of the valve to communicate with said passageway; a valve-operating member mounted on a horizontal axis and connected with said valve, a weight-carrying member mounted on said axis and coöperating with and having a lost motion connection with said valve-operating member; means for automatically moving said weight-carrying member in either direction past a dead-center and having a lost-motion connection with the weight-carrying member; and a float connected with said means, said parts being so connected with one another that movement of said weight-carrying member induced by a downward movement of said float causes said valve to be opened.

In testimony whereof, I have hereunto set my hand this 19th day of January, 1917.

JAMES T. BRIEN.

It is hereby certified that in Letters Patent No. 1,312,678, granted August 12, 1919, upon the application of James T. Brien, of Hoosick Falls, New York, for an improvement in "Float-Valves," an error appears in the printed specification requiring correction as follows: In the heading of specification, line 2, name of executrix, for "Jennie R. Brien" read *Jennie A. Brien;* and that the said Letters Patent should be read with this correction therein that the same may conform to the record of the case in the Patent Office.

Signed and sealed this 16th day of September, A. D., 1919.

[SEAL.]

M. H. COULSTON,
*Acting Commissioner of Patents.*

Cl. 137—104.